Patented Aug. 27, 1929.

1,726,172

UNITED STATES PATENT OFFICE.

WILLIAM H. WILLIAMS AND JOSEPH W. BRITTON, OF MIDLAND, MICHIGAN, ASSIGNORS TO THE DOW CHEMICAL COMPANY, OF MIDLAND, MICHIGAN, A CORPORATION OF MICHIGAN.

METHOD OF MAKING ARYLAMINES.

No Drawing.  Application filed April 22, 1927. Serial No. 185,907.

Various attempts have been made to prepare arylamines from the corresponding halogenated aromatic hydrocarbon derivatives by direct reaction between the latter and ammonia at an elevated temperature and corresponding high pressure but, so far as we are aware, no commercial success has attended efforts heretofore made along this line. In the main such failure may be attributed to inability to secure a proper yield of the desired end product, so that the process is unprofitable. In certain cases where a relatively high yield has been obtained, it has been found upon trial that the reacting mixture has such a destructive effect on the containers or apparatus in which the process is conducted as to render such processes impracticable.

In our application filed March 1, 1926, Serial No. 91,565, we disclose a method more particularly directed to the preparation of aniline or phenylamine $C_6H_5.NH_2$ from the corresponding halogenated benezene, e. g. chlorobenzene, by a process of the general type described above wherein the reaction is greatly promoted and a much higher yield of aniline obtained by the addition to the reaction mixture of certain ingredients. This method or process, it may be stated, has proven entirely practicable when operated on a commercial scale, not only in the respects noted, but also in the important particular that the expensive apparatus required for carrying out such a high pressure high temperature reaction has been found unaffected by the reaction mixture after a considerable period of use. We have now further extended our investigation of this improved process and find in the first place that it is applicable generally to the preparation of arylamines, i. e. is not limited in any sense to the preparation of aniline specifically; furthermore certain modifications and improvements in the procedure have been discovered which add measurably to the ease and smoothness of operation.

The present improved process accordingly consists of the steps hereinafter fully described and particularly pointed out in the claims; the following description setting forth but several of the various ways in which the principle of the invention may be used.

The following is given as a specific example of the procedure involved in carrying out our improved method or process for the making of aniline, viz:—

In starting the operation a suitable quantity of chlorobenzene is mixed with a 25 to 30 per cent aqueous ammonia solution in such amount as to furnish from 4 to 5 mol. of anhydrous ammonia to one mol. of chlorobenzene. This mixture is then charged with from 0.1 to 0.2 mol. of cuprous oxide, hydroxide, or chloride, or a mixture thereof, (the cuprous oxide or hydroxide being preferred) into a suitable closed reaction chamber, such as an iron autoclave capable of withstanding a working pressure as high as several thousand pounds, and the mixture thereupon heated with stirring to a temperature of from 150 to 250 degrees C. and with a corresponding pressure, viz, from 500 to 1500 pounds. The time of heating will vary with the temperature and pressure thus applied from 12 hours for the lower temperature to from 4 to 5 hours at the higher temperature.

The general reaction that occurs may be represented by the following equation, viz:—

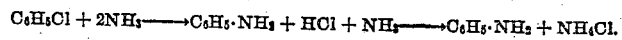

$C_6H_5Cl + 2NH_3 \longrightarrow C_6H_5.NH_2 + HCl + NH_3 \longrightarrow C_6H_5.NH_2 + NH_4Cl.$ A certain amount of phenol will be simultaneously formed by hydrolysis of the chlorobenzene, but this limited or controlled by the excess of ammonia employed. A small amount of diphenylamine

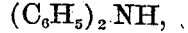

$(C_6H_5)_2NH,$ is also formed as a side product; while the excess ammonia will remain of course, as well as any unreacted chlorobenzene. In addition to reacting with the latter, the ammonia and ammonium chloride react with the cuprous oxide, hydroxide, or chloride introduced into the reaction mixture as aforesaid to yield certain copper-ammoniacal compounds that are of special significance and interest in the present connection.

It is quite important that air be prevented from coming in contact with the reaction mixture, and to this end the autoclave should be initially filled with ammonia gas and an atmosphere of ammonia thereafter maintained, as the operation described is repeated.

Upon completion of the reaction in the first or main stage of the operation, the products still in the form of a liquid mixture resulting therefrom are discharged under pressure of the ammonia gas in the autoclave into a suitable closed vessel for removal first of the free ammonia and then for the treatment of the other ingredients in such mixture as will now be described. These ingredients will include the aniline oil containing unreacted chlorobenzene with some phenol as well as some diphenylamine; also the water from the aqueous solution of ammonia which will contain ammonium chloride with any excess of ammonia present. There will also be dissolved in such aqueous solution and to a certain extent in the aniline oil the above-mentioned copper-ammoniacal compounds.

Upon allowing the reaction mixture containing the indicated ingredients to stand for a sufficient length of time, the aniline oil with unreacted chlorobenzene and such phenol and diphenylamine as are present will settle out as a bottom layer separate from the aqueous solution containing ammonium chloride with any excess of ammonia present. Such aqueous layer will also contain a small quantity of aniline in solution in addition to the above mentioned copper-ammoniacal compound. The top layer, consisting of such aqueous solution, is then run off and treated with a caustic compound, that is the soluble oxide or hydroxide of any alkali metal or alkaline earth metal (e. g. caustic soda or lime) in an amount somewhat in excess of the ammonium chloride contained therein, thereby freeing the ammonia which is steamed out for use over again. The caustic compound has the effect of causing the aforesaid copper compounds, the exact composition of which has not been ascertained, to precipitate out in the form of a sludge. This sludge after settling is filtered and, if desired, may be washed with water, steamed or blown with air, but not too thoroughly dried in air, and is then used over again in a repetition of the process, being substituted for the cuprous chloride, oxide or hydroxide previously specified.

The aniline layer is separately treated with a caustic compound, preferably caustic soda, the latter being added either (a) in an amount approximately just sufficient to liberate the ammonia from any ammonium chloride and copper-ammoniacal compounds present, or (b) in an amount sufficient in addition to the foregoing to react with the phenol as well.

After treatment with such caustic compound, the resulting mixture is next subjected to steam distillation with the result that (a) where only the ammonia has been freed, the following products will be distilled off in the order stated, viz., such ammonia, chlorobenzol, aniline and phenol (together) and diphenylamine, or (b) where enough caustic compound has been added to react with the phenol, the following products will be distilled off in the order stated, viz., ammonia, chlorobenzol, aniline and diphenylamine, the phenate formed by reaction of the caustic compound with the phenol remaining in solution.

In either case there will also remain in the solution a precipitate which settles out in the form of a sludge, such precipitate resulting from the reaction of the caustic compound with such of the aforesaid copper compounds as were retained in the aniline layer. This sludge will be separated and treated in exactly the same manner as that described in the case of the sludge derived from the aqueous layer and, like the former, may then be used over again in a repetition of the process, being substituted for the cuprous chloride, oxide, or hydroxide previously specified. The sludge thus derived from the oily or aniline layer is found to be even more active as a catalytic agent in promoting the main reaction than the sludge from the aqueous layer and the two materials will desirably be intermixed and used together rather than separately. In case there is a loss in copper, as may be determined by analysis, the deficiency may, if desired, be made up by adding more cuprous oxide or chloride to form the equivalent of that used in starting the process.

In conclusion it should be stated that our improved process is applicable not merely to analine or phenylamine, $C_6H_5.NH_2$, but to the production of the homologues of aniline, or the various arylamines, in general, as illustrated by the following examples, viz:—

1. Dichlorobenzene, $C_6H_4Cl_2$, with ammonium cuprous chloride and copper, readily yields $C_6H_4(NH_2)_2$, phenylene-diamine.
2. Chlorotoluene, $CH_3C_6H_4Cl$, similarly yields $CH_3C_6H_4NH_2$, toluidine.
3. Chloronaphthalene, $C_{10}H_7Cl$, similarly yields $C_{10}H_7NH_2$, naphthylamine.
4. Chloroanthraquinone, $C_{14}H_7O_2Cl$, similarly yields $C_{14}H_7O_2NH_2$, amino-anthraquinone.

Certain of the foregoing homologues of aniline or equivalent arylamines, it should further be explained, may not be separable by dry distillation, but in such case separation may be effected by an extraction process using chlorobenzene or equivalent solvent.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. In a method of making an arylamine, the steps which consist in reacting between the corresponding halogenated aromatic hydrocarbon and aqueous ammonia in the presence of a cuprous compound, whereby a mixture of such arylamine and an aqueous solution containing various copper compounds is produced, causticizing such solution, whereby a precipitate is formed of such compounds, and repeating the first step using such precipitate for the cuprous compound therein.

2. In a method of making an arylamine, the steps which consist in reacting between the corresponding halogenated aromatic hydrocarbon and aqueous ammonia in the presence of cuprous oxide, whereby a mixture of such arylamine and an aqueous solution containing various copper compounds is produced, causticizing such solution, whereby a precipitate is formed of such compounds, and repeating the first step using such precipitate for the cuprous oxide therein.

3. In a method of making an arylamine, the steps which consist in reacting between the corresponding halogenated aromatic hydrocarbon and aqueous ammonia in the presence of cuprous oxide, whereby a mixture of such arylamine and an aqueous solution containing various copper compounds is produced separating such arylamine and solution, causticizing the latter, whereby a precipitate is formed of such compounds, and repeating the first step using such precipitate for the cuprous oxide therein.

4. In a method of making an arylamine, the steps which consist in reacting between the corresponding halogenated aromatic hydrocarbon and aqueous ammonia in the presence of a cuprous compound, whereby a mixture of such arylamine and an aqueous solution is produced, such arylamine carrying with it other compounds, separating such arylamine and solution, adding a caustic compound to such arylamine and then distilling until a precipitate of copper compounds is left, and repeating the first step using such precipitate for the cuprous compound therein.

5. In a method of making an arylamine, the steps which consist in reacting between the corresponding halogenated aromatic hydrocarbon and aqueous ammonia in the presence of cuprous oxide, whereby a mixture of such arylamine and an aqueous solution is produced, such arylamine carrying with it other compounds, separating such arylamine and solution, adding a caustic compound to such arylamine and then distilling until a precipitate of copper compounds is left, and repeating the first step using such precipitate for the cuprous oxide therein.

6. In a method of making an arylamine, the steps which consist in reacting between the corresponding halogenated aromatic hydrocarbon and aqueous ammonia in the presence of a cuprous compound, whereby a mixture of such arylamine and an aqueous solution is produced, such arylamine carrying with it other compounds, separating such arylamine and solution, adding a caustic compound to such arylamine and then distilling until a precipitate of copper compounds is left, causticizing the solution separated from such arylamine, whereby a precipitate is formed of the copper compounds therein, and repeating the first step using a mixture of the two precipitates obtained as aforesaid for the cuprous compound in such step.

7. In a method of making an arylamine, the steps which consist in reacting between the corresponding halogenated aromatic hydrocarbon and aqueous ammonia in the presence of cuprous oxide, whereby a mixture of such arylamine and an aqueous solution is produced, such arylamine carrying with it other compounds, separating such arylamine and solution, adding a caustic compound to such arylamine and then distilling until a precipitate of copper compounds is left, causticizing the solution separated from such arylamine, whereby a precipitate is formed of the copper compounds therein, and repeating the first step using a mixture of the two precipitates obtained as aforesaid for the cuprous oxide in such step.

8. In a method of making aniline, the steps which consist in reacting between a monohalogenated benzene and aqueous ammonia in the presence of a cuprous compound, whereby a mixture of aniline oil and an aqueous solution is produced, such oil carrying with it other compounds, separating such oil and solution, adding a caustic compound to such oil and then distilling until a precipitate of copper compounds is left, and repeating the first step using such precipitate for the cuprous compound therein.

9. In a method of making aniline, the steps which consist in reacting between a monohalogenated benzene and aqueous ammonia in the presence of cuprous oxide, whereby a mixture of aniline oil and an aqueous solution is produced, such oil carrying with it other compounds, separating such oil and solution, adding a caustic compound to such oil and then distilling until a precipitate of copper compounds is left, and repeating the first step using such precipitate for the cuprous oxide therein.

10. In a method of making aniline, the steps which consist in reacting between a monohalogenated benzene and aqueous ammonia in the presence of a cuprous compound, whereby a mixture of aniline oil and an aqueous solution containing various copper compounds is produced, such oil carrying with it other compounds, separating such oil and solution, adding a caustic compound to such oil and distilling the same with steam until a body mainly consisting of water with a precipitate therein is left, causticizing the solution separated from such oil, whereby a precipitate is formed of the copper compounds therein, and repeating the first step using a mixture of the two precipitates obtained as aforesaid for the cuprous compound in such step.

11. In a method of making aniline, the steps which consist in reacting between a monohalogenated benzene and aqueous ammonia in the presence of cuprous oxide, whereby a mixture of aniline oil and an aqueous solution containing various copper compounds is produced, such oil carrying with it other compounds, separating such oil and solution, adding a caustic compound to such oil and distilling the same with steam until a body mainly consisting of water with a precipitate therein is left, causticizing the solution separated from such oil, whereby a precipitate is formed of the copper compounds therein, and repeating the first step using a mixture of the two precipitates obtained as aforesaid for the cuprous oxide in such step.

12. In a method of making aniline, the steps which consist in reacting between a mixture of chlorobenzene and aqueous ammonia solution, in approximately the proportion of one molecule of the former to five molecules of anhydrous ammonia, in the presence of a cuprous compound, whereby a mixture of aniline oil and an aqueous solution is produced, both such oil and solution containing various copper compounds, separating such oil and solution, adding a caustic compound to such oil and then distilling until a precipitate of the copper compounds is left, and repeating the first step using such precipitate for the cuprous compound therein.

13. In a method of making aniline, the steps which consist in reacting between a mixture of chlorobenzene and aqueous ammonia solution, in approximately the proportion of one molecule of the former to five molecules of anhydrous ammonia, in the presence of a cuprous oxide, whereby a mixture of aniline oil and an aqueous solution is produced, both such oil and solution containing various copper compounds, separating such oil and solution, adding a caustic compound to such oil and then distilling until a precipitate of the copper compounds is left, and repeating the first step using such precipitate for the cuprous oxide therein.

14. In a method of making aniline, the steps which consist in reacting between a mixture of chlorobenzene and aqueous ammonia solution, in approximately the proportion of one molecule of the former to five molecules of anhydrous ammonia, in the presence of a cuprous compound, whereby a mixture of aniline oil and an aqueous solution is produced, both such oil and solution containing various copper compounds, separating such oil and solution, adding a caustic compound to such oil and then distilling until a precipitate of the copper compounds is left, causticizing such solution, whereby a precipitate is produced, and repeating the first step using a mixture of the two precipitates obtained as aforesaid for the cuprous compound in such step.

15. The method of making an arylamine which comprises reacting between a halogenated aromatic hydrocarbon and aqueous ammonia solution in the presence of copper compounds derived by causticizing the arylamine product from a similar reaction in the presence of a cuprous compound.

16. The method of making an arylamine which comprises reacting between a halogenated aromatic hydrocarbon and aqueous ammonia solution in the presence of copper compounds derived by causticizing the arylamine product and the aqueous solution from a simlar reaction carried out with addition of a cuprous compound.

17. The method of making aniline which comprises reacting between a monohalogenated benzene and aqueous ammonia solution in the presence of copper compounds derived by causticizing the aniline product of a similar reaction carried out with addition of a cuprous compound.

18. The method of making aniline which comprises reacting between a monohalogenated benzene and aqueous ammonia solution in the presence of copper compounds derived by causticizing both the aniline product and the aqueous solution from a simlar reaction carried out with addition of a cuprous compound.

19. As an ingredient for promoting the reaction between a halogenated aromatic hydrocarbon and ammonia to produce an arylamine, the copper compound derived by causticizing the arylamine product from a similar reaction in the presence of a cuprous compound.

20. As an ingredient for promoting the reaction between chlorobenezene and ammonia to produce aniline, the copper compound derived by causticizing the aniline product from a similar reaction in the presence of a cuprous compound.

21. As an ingredient for promoting the reaction between a halogenated aromatic hydrocarbon and ammonia to produce an arylamine, the copper compound derived by causticizing reaction products from a similar reaction in the presence of a cuprous compound.

22. The method of making an arylamine which comprises reacting between a halogenated aromatic hydrocarbon and aqueous ammonia solution in the presence of copper compounds derived by causticizing the reaction products from a similar reaction carried out with addition of a cuprous compound.

23. In a method of making aniline, the steps which consist in reacting between a monohalogenated benzene and aqueous ammonia in the presence of a cuprous compound, whereby a mixture of aniline oil and an aqueous solution containing various copper compounds is produced, such oil carrying with it other compounds, treating such oil and such solution with a caustic compound, removing ammonia, segregating copper-containing sludge-precipitates in such oil and such solution, and repeating the first step using a mixture of the two precipitates obtained as aforesaid for the cuprous compound in such step.

24. The method of making an arylamine, which comprises reacting between a halogenated aromatic hydrocarbon and aqueous ammonia solution in the presence of copper compounds derived by causticizing the reaction products from a similar reaction carried out with the addition of a cuprous compound, while preventing air from coming in contact with the reaction mixture.

25. The method of making an arylamine, which comprises reacting between a halogenated aromatic hydrocarbon and aqueous ammonia solution in the presence of copper compounds derived by causticizing the reaction products from a similar reaction carried out with the addition of a cuprous compound, while preventing air from coming in contact with the reaction mixture by maintaining an atmosphere of ammonia within the reaction vessel.

26. The method of making aniline, which comprises reacting between a monohalogenated benzene and aqueous ammonia solution in the presence of copper compounds derived by causticizing the reaction products from a similar reaction carried out with the addition of a cuprous compound, while preventing air from coming in contact with the reaction mixture.

27. The method of making aniline, which comprises reacting between a monohalogenated benzene and aqueous ammonia solution in the presence of copper compounds derived by causticizing the reaction products from a similar reaction carried out with the addition of a cuprous compound, while preventing air from coming in contact with the reaction mixture while maintaining an atmosphere of ammonia within the reaction vessel.

Signed by us this 1st day of April, 1927.
WILLIAM H. WILLIAMS.
JOSEPH W. BRITTON.